United States Patent
Hofbeck et al.

(10) Patent No.: US 7,090,247 B2
(45) Date of Patent: Aug. 15, 2006

(54) SYSTEM AND METHOD FOR DETECTING THE SEAT OCCUPANCY IN A VEHICLE

(75) Inventors: Klaus Hofbeck, Neumarkt (DE); Birgit Rösel, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 89 days.

(21) Appl. No.: 10/842,099

(22) Filed: May 10, 2004

(65) Prior Publication Data

US 2004/0245035 A1    Dec. 9, 2004

Related U.S. Application Data

(63) Continuation of application No. PCT/DE03/03467, filed on Oct. 20, 2003.

(30) Foreign Application Priority Data

Nov. 20, 2002    (DE) ................. 102 54 202

(51) Int. Cl.
*B60R 21/015* (2006.01)
(52) U.S. Cl. ...................... 280/735; 342/72
(58) Field of Classification Search ............. 280/735; 701/45; 342/72, 42, 51; 340/825.49, 10.32
See application file for complete search history.

(56) References Cited

U.S. PATENT DOCUMENTS

| | | | |
|---|---|---|---|
| 6,084,530 A * | 7/2000 | Pidwerbetsky et al. .. | 340/10.32 |
| 6,199,904 B1 | 3/2001 | Dosdall ..................... | 280/735 |
| 6,220,627 B1 * | 4/2001 | Stanley ..................... | 280/735 |
| 6,243,012 B1 * | 6/2001 | Shober et al. ........... | 340/572.7 |
| 6,462,701 B1 | 10/2002 | Finn ......................... | 342/72 |
| 6,809,629 B1 * | 10/2004 | Heide et al. .............. | 340/5.61 |

FOREIGN PATENT DOCUMENTS

DE    199 57 557 A1    6/2001

OTHER PUBLICATIONS

Williamson et al.; "A coded radar reflector for remote identification of personnel and vehicles"; IEEE; 1993.*

* cited by examiner

*Primary Examiner*—David R. Dunn
(74) *Attorney, Agent, or Firm*—Baker Botts L.L.P.

(57) ABSTRACT

A system for detecting the seat occupancy in a vehicle includes a microwave transmitter (10) and a plurality of small-area reflectors (12) which are arranged in the vehicle. By activating or deactivating the different reflectors (12) during different time intervals, the reflectors (12) can be identified via the unequivocal assignment between the time intervals and the reflectors. This makes it possible to use narrow-band microwave radiation, since it is then not absolutely necessary to identify the reflectors (12) with the aid of different frequencies. It is also possible to arrange receivers in the seat (20) instead of reflectors (12).

23 Claims, 5 Drawing Sheets

1

SYSTEM AND METHOD FOR DETECTING THE SEAT OCCUPANCY IN A VEHICLE

CROSS REFERENCE TO RELATED APPLICATION

This application is a continuation of copending International Application No. PCT/DE03/03467 filed Oct. 20, 2003 which designates the United States, and claims priority to German application no. 102 54 202.3 filed Nov. 20, 2002.

TECHNICAL FIELD OF THE INVENTION

The invention relates to a system for detecting the seat occupancy in a vehicle, with one or more microwave transmitters and a means of reflecting or receiving microwave radiation, arranged in a vehicle, in such a way that the one or more microwave transmitters and the means of reflecting or receiving are arranged so that the received or reflected intensity depends on the seat occupancy in the vehicle.

DESCRIPTION OF THE RELATED ART

The invention also relates to a method for detecting the seat occupancy in a vehicle, with the following steps: transmitting microwave radiation and reflecting or receiving the microwave radiation with the aid of a means of reflecting or receiving, arranged in a vehicle, in such a way that the one or more microwave transmitters and the means of reflecting or receiving are arranged so that the received or reflected intensity depends on the seat occupancy in the vehicle.

Systems and methods of this kind are known. They are used in particular to influence the deployment of an airbag in accordance with the seat occupancy.

An example of such a system and method is known from U.S. Pat. No. 6,199,904 B1. In this, microwaves are sent by a microwave transmitter to a reflecting structure in a vehicle seat. The reflected microwaves are detected by a microwave receiver. Since the intensity of the reflected microwaves depends on whether the microwave radiation is impeded by a person occupying the seat, a conclusion about occupancy of the seat can be drawn from the result of an analysis. A disadvantage of the system and method is, however, that control of the airbag is not always based on reliable analysis. For example reflection can occur from objects other than the reflective object provided for that purpose in the seat. It would then be mistakenly assumed that the seat was not occupied, and the airbag could be disabled as a result. This could have fatal consequences for the passengers in the vehicle. Furthermore the calibration needed in connection with this design is very expensive, driving up the cost of the system. Moreover every additional analysis involves computing time, which would conflict with dynamic measurement, that is, a measurement taking place only when the vehicle is in a collision. Likewise in U.S. Pat. No. 6,199,904 B1 no special precautions are taken to distinguish between reflections from different locations within the vehicle. It would be desirable to be able to make such a distinction, since it is then for instance possible to distinguish between the different seating locations in the vehicle.

"Detecting seat occupancy" involves detecting whether a seat is occupied, detecting the position in which the person occupying the seat is sitting and/or detecting the build of the person in that seat.

SUMMARY OF THE INVENTION

The object of the invention is to provide a system and a method which overcome the disadvantages of the prior art and in particular which make it possible to distinguish between different locations in the vehicle.

This object can be achieved by a system for detecting the seat occupancy in a vehicle, comprising at least one microwave transmitter, reflectors which are arranged in the vehicle, and at least one microwave receiver, wherein the one or more microwave transmitters and the reflectors are arranged so that the reflected intensity depends on the seat occupancy in the vehicle, the reflectors can be selectively activated or deactivated during defined time intervals, the reflectors can be distinguished from one another via an assignment of the reflectors to the time intervals, and the reflectors are modulating back-scatter devices.

The reflectors can be arranged in at least one vehicle seat and/or one head restraint. The back-scatter devices can be modulated at the same frequency. The back-scatter devices can be modulated at the different frequencies. Reflectors can be arranged one below the other in a rest or support in the vehicle seat. The back-scatter device can be produced as a passive, semi-passive or active back-scatter device. The seat occupancy may affect the received intensity by virtue of the diffraction of the microwaves and the received intensity may provide information on the seat occupancy. The one or more microwave transmitters and the one or more microwave receivers can be produced as one or more microwave transmitting and receiving devices with transmitting and receiving antennae. A control unit which triggers, disables or enables functions in the vehicle may depend on the radiation received is provided. The one or more microwave transmitters and/or the one or more microwave receivers can be components of an access control and start-up system installed in the vehicle. Evaluation of the signals received by the microwave receiver can be supported or carried out in ways which are used in the context of an access control and start-up system installed in the vehicle. The radiation path can be a straight line. The radiation path can also be a detour.

The object can also be achieved by a method for detecting a seat occupancy in a vehicle, comprising the steps of:

arranging one or more microwave transmitters and the reflectors for transmitting and reflecting microwave radiation in such a way that a received intensity depends on the seat occupancy in the vehicle, transmitting microwave radiation, reflecting the microwave radiation through reflectors which are arranged in the vehicle selectively activating or deactivating the reflectors during defined time intervals and distinguishing the reflectors from one another via an assignment of the reflectors to the time intervals, wherein the reflection takes place by means of a back-scatter process.

The reflectors can be arranged in at least one vehicle seat and/or one head restraint. The back-scatter processes which take place on the different reflectors may use the same modulation frequency. The back-scatter processes which take place on the different reflectors may also use different modulation frequencies. The reflectors can be arranged one below the other in a rest or support in the vehicle seat. The back-scatter process can be produced by a passive, semi-passive, semi-active or active back-scatter device. The seat occupancy may affect the received intensity by virtue of the diffraction of the microwaves, and the received intensity may provide information on the seat occupancy. Functions in the vehicle can be triggered, disabled or enabled depending on the radiation received. Transmission and/or receiving may take place on the basis of an access control and start-up system installed in the vehicle. Evaluation of the signals received can be supported or carried out in ways which are used in the context of an access control and start-up system installed in the vehicle. The radiation path can be a straight line or a detour.

The invention is based on the kind of system in which the means of reflecting or receiving includes a plurality of elements for reflecting or receiving, and in which the plurality of elements can be selectively activated or deactivated during defined time intervals, and in which the elements can be distinguished from one another by means of the assignment of the elements to the said time intervals. The elements for reflecting or receiving are activated in turn in such a way that time slots are unequivocally assigned to each element. This can be done for example by supplying the elements with current in the assigned time slots so that they can reflect or receive microwaves in these same time slots. In principle the system to which the invention relates can be produced by arranging reflectors or receivers in the vehicle seat. These different technical options are therefore summarised by the general expression "means or elements for reflecting or receiving".

It is particularly useful that the elements for reflecting or receiving should be arranged in at least one vehicle seat and/or one head restraint. These elements may be covered up or revealed to a greater or lesser extent depending on the seat occupancy. If a person is sitting in the seat in the usual way, a larger number of elements will be covered than is the case when the person moves out of the usual position. In the same way it is possible to distinguish between persons with different body sizes, since small people will cover up fewer elements than larger people.

The system to which the invention relates has further particularly advantageous features in that the elements for reflecting or receiving are back-scatter devices and that the system includes one or more microwave receivers capable of receiving radiation reflected by the back-scatter devices. The use of back-scatter devices then makes it possible to distinguish the reflector from other metallic conducting objects without further effort. Thus if for instance the microwave radiation is reflected in the casing of a laptop being used by a passenger in a private motor car, this does not lead the system to suppose that a seat is unoccupied. An airbag would therefore still deploy in the event of a collision. The terms "reflector, reflecting, etc." are used in the present disclosure with a very wide meaning. For instance they mean not only reflections in the classic sense, but also the reflection of electromagnetic radiation by means of a modulating back-scatter process.

The back-scatter devices can be provided in the form of modulating back-scatter devices. The pattern produced by modulation can be used to assign the reflection unequivocally to a back-scatter device.

In this connection it is especially useful that the back-scatter devices can be modulated at the same frequency. By this means the transmitting and receiving devices can be constructed very simply and the use of modulated, reflected radiation has the effect of maintaining the complete system functionality.

It is also possible for the back-scatter devices to be modulated at different frequencies. By this means the modulation frequency can be used on its own to distinguish between the individual reflectors.

But even in the case where different time slots are assigned to the various elements, modulation at different frequencies can be worthwhile in certain circumstances, since in this way the system is made all the safer by the redundancy.

It is particularly useful that a plurality of elements for reflecting or receiving should be arranged one below the other in a rest or support in the vehicle seat. For example if the microwave transmitter is located at roof level in the forward part of the vehicle, the maximum number of elements is covered up when a person is sitting normally. If the person leans forward, the elements arranged one below the other are successively revealed, and the received intensity increases in steps. Then for instance thresholds beyond which an airbag must not deploy can be built into a slope of the stepped curve so that the thresholds precisely match a defined angle at which the person is leaning in the vehicle seat.

The system to which the invention relates can have further embodiments in which the back-scatter devices are produced as passive, semi-passive, semi-active or active back-scatter devices. Passive back-scatter devices are particularly simple to construct. They need no additional energy supply and thus provide an especially cost-effective solution. Semi-passive back-scatter devices are operated with the aid of an additional amplifier which consumes a small amount of power. Compared to passive back-scatter devices they have the advantage that reflections can have a higher intensity. For this reason they can be more reliably evaluated. Particularly reliable evaluation would be provided by an active back-scatter device, that is, a back-scatter device with active electronic components.

This particularly reliable evaluation is made possible by the higher microwave intensity. On the other hand the microwave radiation loading on the vehicle passengers is higher in this embodiment of the present invention than in the case of passive back-scatter devices.

Moreover the system can have a further embodiment with particularly useful features in which the seat occupancy affects the received intensity by virtue of the diffraction of the microwaves so that the received intensity provides information on the seat occupancy. Since microwave radiation, unlike infra-red radiation for instance, can exhibit marked diffraction fringes by reason of its wavelength when an object is placed in the radiation path, it is possible to make use of the changes in intensity that occur due to diffraction effects. In this way an empty seat can be distinguished from a seat occupied by an adult and also for example from a seat holding a child and a child seat, since in the last case, due to the higher position occasioned by the child seat, diffraction of microwave radiation can also occur at elements placed on the surface of the seat.

Usefully it is possible to arrange that the path used by the microwave radiation between the microwave transmitter and the microwave receiver or the means of reflecting or receiving can be determined by measuring the signal propagation time. It is then possible to determine the occupancy of the seat. This makes further information available to an airbag control unit.

In a particularly advantageous way it is possible to arrange that the position of a seat can be determined and that from the result of determining the path and determining the position of the seat it is then possible to determine whether the received radiation was transmitted by the microwave transmitter.

Such considerations of plausibility are mainly superfluous when a back-scatter device is being used as a reflector, but may nevertheless be applied in the matter of redundancy. However these considerations are particularly useful with regard to the propagation time of the microwave signals, for example if no pattern has been modulated onto the reflected microwave radiation by a back-scatter process. By further analysing the position of the seat it is then possible to determine whether the reflection at a reflector may for example come from the seat support or whether the reflection comes for example from a laptop on a passenger's knee.

It is advantageous for the one or more microwave transmitters and the one or more microwave receivers to be produced as one or more microwave transmitting and receiving devices with transmitting and receiving antennae. The microwave radiation then travels from the microwave transmitting and receiving device to the reflectors and from the reflectors back to the microwave transmitting and receiving device. The microwave transmitting and receiving device may be located in for example the instrument panel of the vehicle or in the roof. When the microwave transmitting and receiving device is arranged in such a way the previously described changes in the position of occupants can be reliably detected. Likewise it is possible to distinguish between people with different body sizes as discussed above. But for example it is also possible for a child seat to be safely transported on the passenger seat. The greater proportion of the microwave radiation will reach the reflectors unhindered and return from there to the receiver, so that deployment of an airbag can be prevented, since the child seat consists generally of plastic and in principle lifts the child up. As an additional safety measure it is possible to fit a further reflector on the child seat. This ensures that microwave radiation is reflected that would otherwise be absorbed by the child seat or by the child sitting in that seat. Deployment of the airbag can then still be reliably prevented. If back-scatter devices are used as reflectors, the back-scatter devices in the seat support or on the child seat can modulate the signals differently, making it possible to detect unequivocally that the seat is occupied by a child seat.

An especially useful feature is the provision of a control unit which triggers, disables or enables functions in the vehicle depending on the radiation received. Seat occupancy detection can also be worthwhile in conjunction with other functions in the vehicle, but the capability to enable or disable an airbag is a particularly important achievement of the present invention.

This can also be designed so that for example the one or more microwave transmitters and/or the one or more microwave receivers are components of an access control and start-up system installed in the vehicle. In microwave-based access control and start-up systems, the antenna for covering the passenger compartment is generally in such a position that it can also address the elements for reflecting or receiving that are installed in the vehicle seats. Consequently, due to the embodiment of the present invention, in which components of the access control and start-up system are used for detecting seat occupancy, an integrated and therefore cost-reducing measure can be made available.

On comparable grounds it can be advantageous that evaluation of the signals received by the microwave receiver should be supported or carried out in ways which are used in the context of an access control and start-up system installed in the vehicle.

The system can be designed so that the radiation path is a straight line. In the present connection, any mention of a straight-line radiation path relates to propagation of the radiation in the absence of diffraction fringes. The present embodiments therefore relate to the geometrical arrangement of the components. Thus there exists a direct line of sight between the transmitter, the means of reflecting or receiving and/or the receiver. In this way a particularly simple system is made available.

However it can also be useful that the radiation path is a detour. The microwave radiation can be guided through the vehicle with the aid of conducting materials built into the vehicle so that specific zones can be deliberately illuminated without the need for microwave transmitting and receiving devices.

The invention is based on the kind of method in which the means of reflecting or receiving includes a plurality of elements for reflecting or receiving, and in which the plurality of elements can be selectively activated or deactivated during defined time intervals, and in which the elements are distinguished from one another by means of the assignment of the elements to the said time intervals.

The advantages and special features of the system to which the invention relates are brought about on the basis of the method to which the invention relates. This also applies to the following specially preferred embodiments of the method to which the invention relates.

The method to which the invention relates has particularly advantageous features in that the elements for reflecting or receiving are arranged in at least one vehicle seat and/or one head restraint.

However it can be useful that the reflection takes place by means of a back-scatter process and that the radiation reflected by the back-scatter process is received.

In this connection it is especially useful if the back-scatter process is a modulated back-scatter process.

Moreover it is preferred that the back-scatter processes which take place on the different elements should use the same modulation frequency.

However it can also be useful that the back-scatter processes taking place on the different elements should use different modulation frequencies.

In a preferred embodiment of the method to which the invention relates, a plurality of elements for reflecting or receiving are arranged one below the other in a rest or support in the vehicle seat.

Furthermore it is preferred that the back-scatter process is produced by a passive, semi-passive, semi-active or active back-scatter device.

In a further, likewise preferred embodiment of the method to which the invention relates, the seat occupancy affects the received intensity by virtue of the diffraction of the microwaves and the received intensity provides information on the seat occupancy.

It is moreover useful that the path used by the microwave radiation between the microwave transmitter and the microwave receiver or the means of reflecting or receiving is determined by measuring the propagation time.

Further advantages can be obtained if the method to which the invention relates arranges that the position of a seat is determined and that the result of determining the path and determining the position of the seat then determines whether the received radiation was transmitted by the microwave transmitter.

It is moreover considered advantageous to provide that functions in the vehicle are triggered, disabled or enabled depending on the radiation received.

Likewise it is considered useful to provide that transmission and/or receiving take place on the basis of an access control and start-up system installed in the vehicle.

In the method to which the invention relates it can be advantageous that evaluation of the received signals should be supported or carried out in ways which are used in the context of an access control and start-up system installed in the vehicle.

It can likewise be advantageous that the radiation path is a straight line.

It can also be advantageous that the radiation path is a detour.

It is moreover useful that the plurality of elements for reflecting or receiving are selectively activated or deactivated during defined time intervals, and that the elements are distinguished from one another by means of the assignment of the elements to the said time intervals.

The invention is based on the knowledge that it is possible to distinguish the different elements for reflecting or receiving when using narrow-band microwave radiation. For this purpose selective, time-shared control is used for activating the different elements. Elements can be distinguished from one another because of an unequivocal assignment between the time intervals and elements concerned. This can be advantageous in systems where a plurality of reflectors with a small surface area is arranged in the vehicle seats, for example. Such systems enable a sharp distinction between a person leaning slightly forward and a situation known as the out-of-position case, that is, a case in which it is absolutely vital that the airbag should not deploy. As the person leans forward the slopes in the intensity curve become progressively steeper when a further element in the vehicle seat is exposed to the microwave radiation. Naturally the same also applies in reverse when the person leans back, for instance during the transition from the out-of-position case into a normal sitting position. In the context of the system to which the invention relates, it can be advantageous to use microwave radiation, which is sufficiently distinctive compared to systems that use radiation such as infra-red. It is also advantageous to use microwave radiation because, compared to other wave forms such as ultrasound, laser radiation or light and infra-red radiation, it is strongly absorbed by the human body. The propagation of microwave radiation takes place regardless of pressure, temperature, brightness and other environmental conditions. The measurement method is very fast due to the simplicity of the evaluation, so that dynamic measurement is possible, for instance only in the case of a collision. Other preferred features of the invention can be recognised from the fact that the seat occupancy can be detected with very great speed. The time for acquisition is typically in the millisecond range. For this reason it is possible to send the airbag controller a dynamic response so that after the airbag has already deployed in accordance with the seat occupancy or the leaning position of the person in the seat, it is possible for instance to influence the filling of the airbag, preferably by reducing the pressure.

BRIEF DESCRIPTION OF THE DRAWINGS

The features and advantages of the invention will emerge from especially preferred typical embodiments and by reference to the accompanying drawings.

These show the following.

DETAILED DESCRIPTION OF THE PREFERRED EMBODIMENTS

In the description which follows of preferred embodiments of the present invention the same reference numbers designate the same or comparable components.

Figure 1:
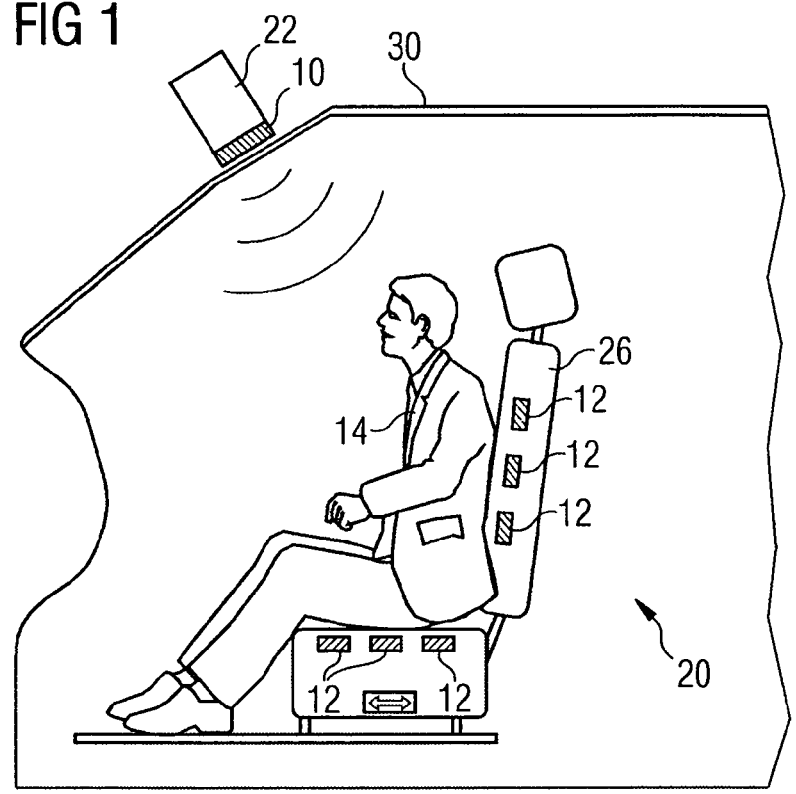
FIG. 1—A preferred embodiment of a system to which the invention relates with a person in a first sitting position.
Figure 2:
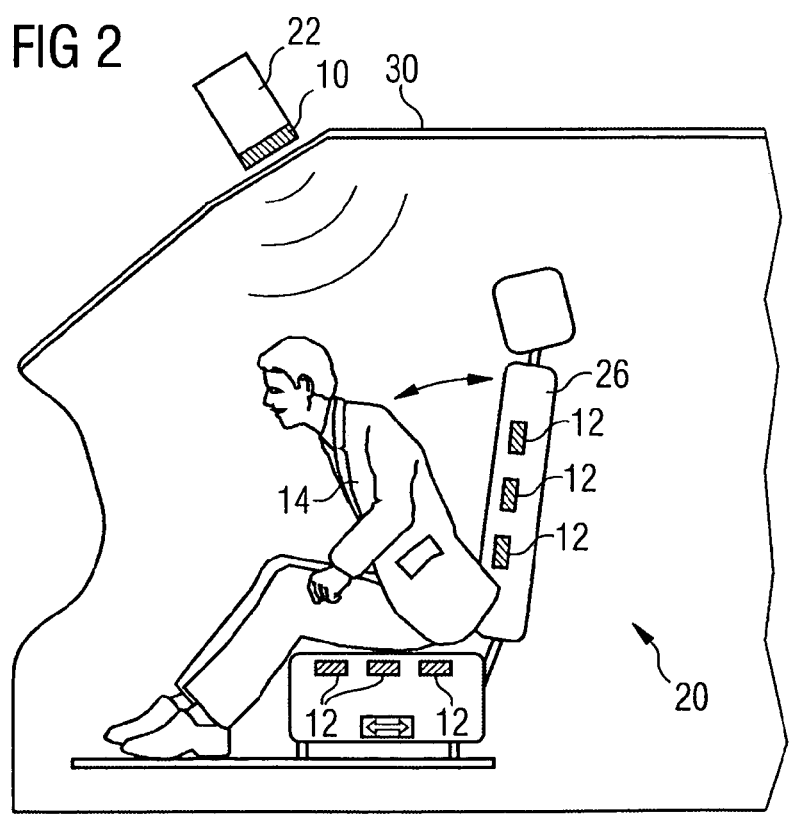
FIG. 2—The embodiment according to FIG. 1 with a person in a second sitting position.

FIG. 1 shows a preferred embodiment of a system to which the invention relates with a person in a first sitting position. FIG. 2 shows the embodiment according to FIG. 1 with a person in a second sitting position. A microwave transmitting and receiving device 10 is arranged close to the roof console 30 of a vehicle and connected to a control unit 22. In a vehicle seat 20 a plurality of reflectors 12 are arranged; depending on the embodiment these can be designed as back-scatter devices or as simple electrically-conducting films. The seat 20 can be moved in the usual way, for which reason it is particularly preferred that the position of the seat 20 can be determined.

FIGS. 1 and 2 show a person 14 sitting in different positions on the seat 20. In FIG. 1 the person 14 is sitting normally. In FIG. 2 the person 14 is leaning forward, so that the upper body of the person 14 is a certain distance from the back support 26 of the seat 20. The position in FIG. 2 can also be called an out-of-position case.

Depending on the sitting position, microwave radiation transmitted by the microwave transmitting and receiving device 10 can now reach more or fewer reflectors 12 and in particular more or fewer of the reflectors 12 arranged in the back support 26 of the seat 20. Accordingly the intensity reflected by the reflectors 12 and the intensity consequently received by the microwave transmitting and receiving device 10 depends on the sitting position of the person 14.

It is especially useful if the various reflectors can be distinguished from one another. This concerns not only the reflectors arranged in a vehicle seat but also reflectors that can be arranged in different vehicle seats within the vehicle or at other locations within the vehicle. It is particularly useful that the reflectors used should be modulating back-scatter devices which can be activated during different time intervals. This activation is typically carried out by supplying the back-scatter device in question with current, whereas the back-scatter device that is not being supplied with current is disabled. If the active time intervals are then unequivocally assigned to the back-scatter devices, the individual back-scatter devices can be unequivocally recognised from this assignment. It is then possible to work with narrow-band microwave radiation, since there is no necessity to distinguish between the different back-scatter devices by using different modulation frequencies. By using such modulation at different frequencies it is possible to distinguish between the back-scatter devices, but as an alternative or in addition to distinguishing via the time interval.

As well as evaluating reflectors in the back support or head restraint, it is also particularly useful to evaluate the sensors in the surface of the seat, since on this basis it is also possible to detect the seat occupancy, including those situations which can be referred to as out-of-position cases.

Figure 3:
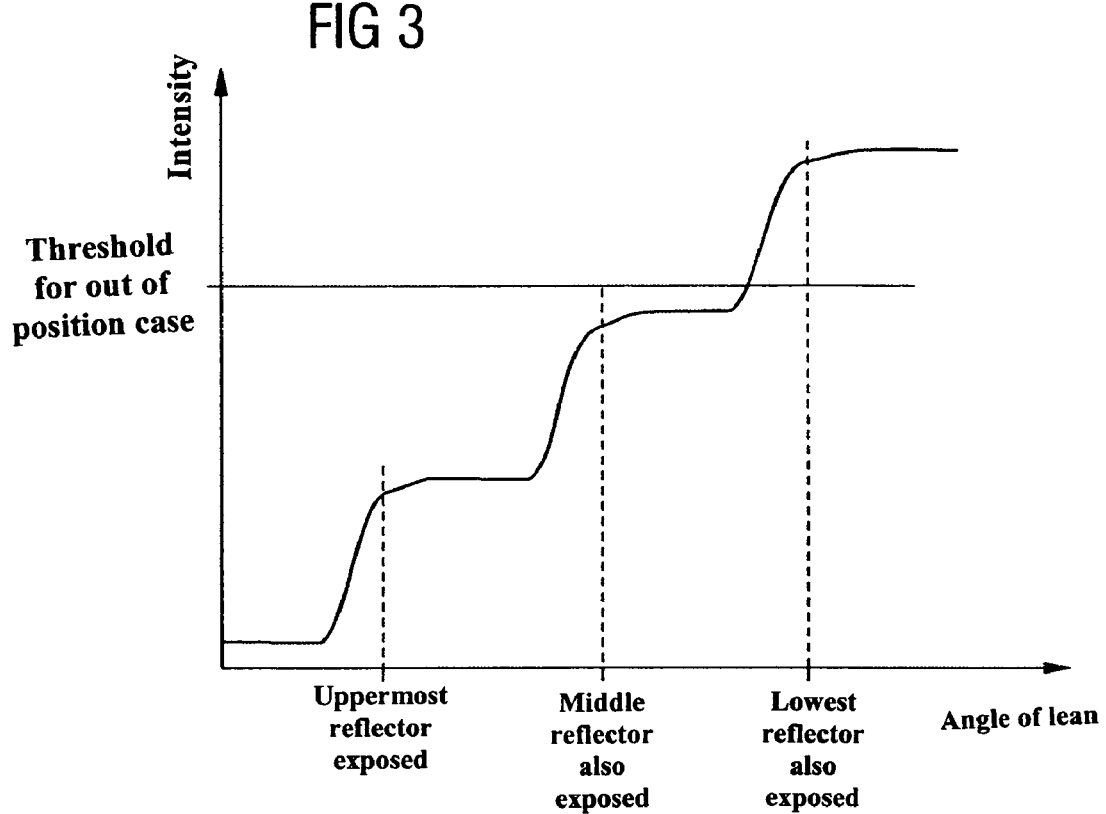
FIG. 3—A diagram for explaining the invention.

FIG. 3 shows a diagram intended to explain a preferred embodiment of the invention. The displayed intensity curve is dependent on the angle at which the person 14 shown in FIGS. 1 and 2 is leaning, and results from the sequential exposure of the different reflectors 12 in the seat support 26. If the person 14 leans forward from the starting position shown in FIG. 1, the uppermost reflector is revealed first, resulting in a slope in the intensity curve. If the person 14 leans further forward the ratios at first alter only slightly or not at all. But if the next reflector 12, that is the middle reflector 12 in the back support 26, is revealed, the next slope appears in the intensity curve. The same happens when the lowest reflector 12 is revealed. If the arrangement of the reflectors 12 and the threshold for the out-of-position case are chosen to be in tune with each other, the threshold can be set in a slope of the intensity curve as shown in FIG. 3, for example. In this way it is possible to define a leaning angle with a low fluctuation width at which the existence of the out-of-position case is assumed.

Figure 4:
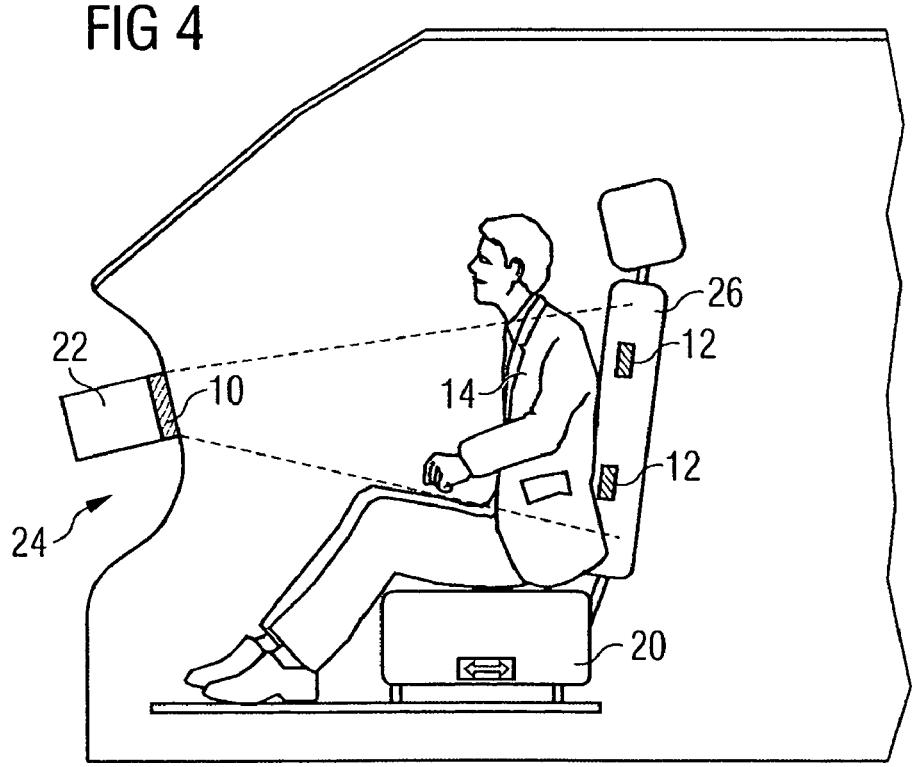
FIG. 4—A further embodiment of the system to which the invention relates with a person in a first sitting position.
Figure 5:
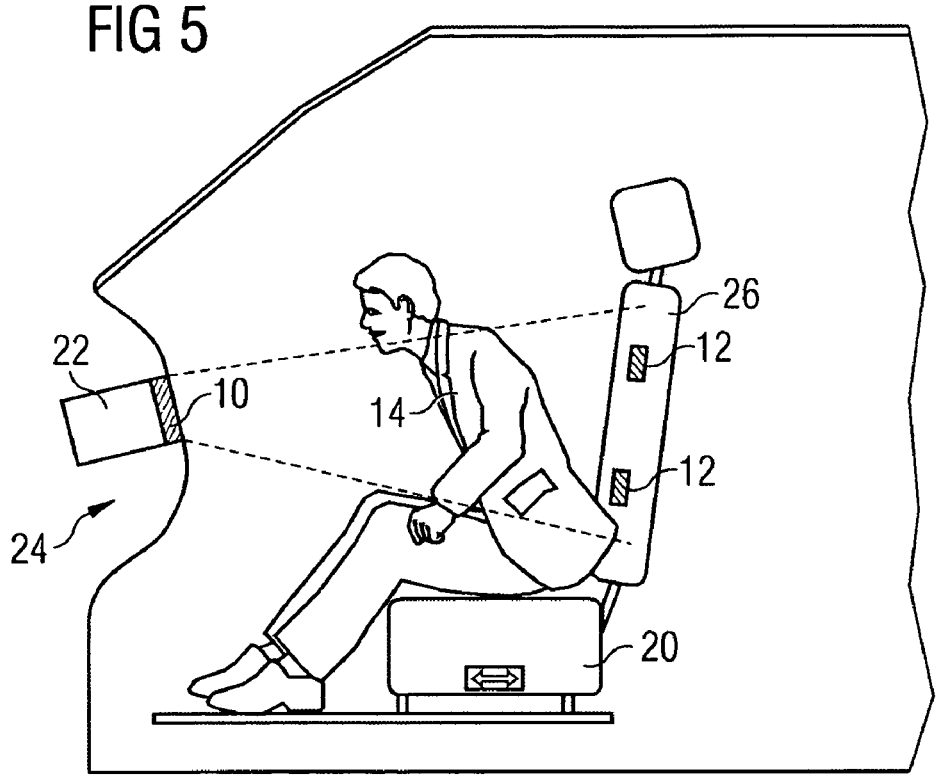
FIG. 5—The embodiment according to FIG. 4 with a person in a second sitting position.

FIG. 4 shows a preferred embodiment of a system to which the invention relates with a person in a first sitting position. FIG. 5 shows the embodiment according to FIG. 4 with a person in a second sitting position. In the system shown here reflectors 12 are arranged only in the back support 26 of the seat 20, that is, in contrast to the illustrations in FIGS. 1 and 2 they are not in the seat surface. In many cases this is sufficient to detect the out-of-position case shown in FIG. 5. As a further difference from FIGS. 1 and 2, in the systems according to FIGS. 4 and 5 the microwave transmitting and receiving device 10 and the control device 22 assigned to it are arranged in the instrument panel 24 of the vehicle. In this case too the reflectors 12 are revealed in succession when the person 14 leans forward. In this arrangement diffraction fringes of the microwaves play an important role, since in the illustration in FIG. 3 the direct line of sight between the reflectors 12 and the microwave transmitting and receiving device 10 as always exists only in part or not at all. Due to diffraction effects, however, the microwaves nevertheless reach from the microwave transmitting and receiving device 10 to the reflectors 12 and from the reflectors 12 to the microwave transmitting and receiving device 10.

Figure 6:
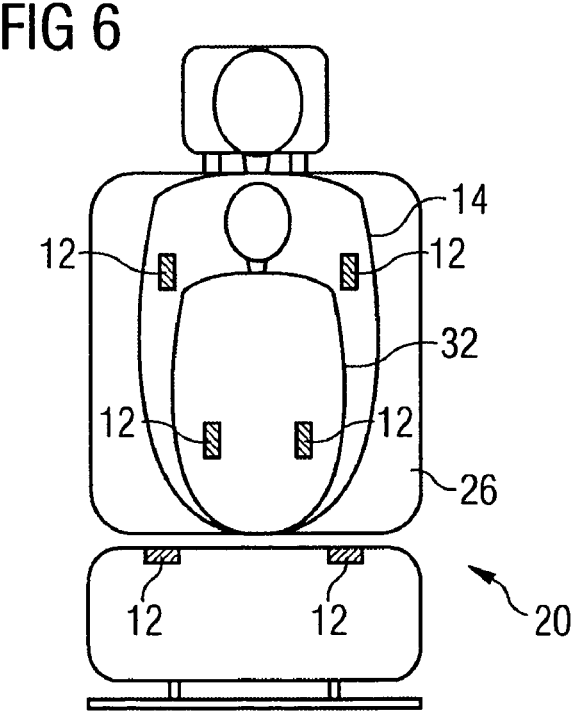
FIG. 6—A vehicle seat for use in a system to which the invention relates with the outlines of the upper body of two people of different sizes.

FIG. 6 shows a vehicle seat for use in a system to which the invention relates with the outlines of the upper body of two people of different sizes. This figure specifies a further typical application in which the advantages of using reflectors 12 with a small surface area in a vehicle seat 20 or particularly in the back support of the vehicle seat 26 are illustrated. The reflectors 12 are arranged in the form of an array. A tall person 14 covers all the reflectors 12 arranged in the back support 26, whereas a short person 32, such as a child, covers only the lower reflectors 12. The system can therefore distinguish unequivocally between tall and short people, especially as there is not just a gradual difference in reflected intensities to be detected, but also erratic differences due to the complete exposure of the upper small-area reflectors 12 caused by the short person 32 moving in the seat.

Figure 7:
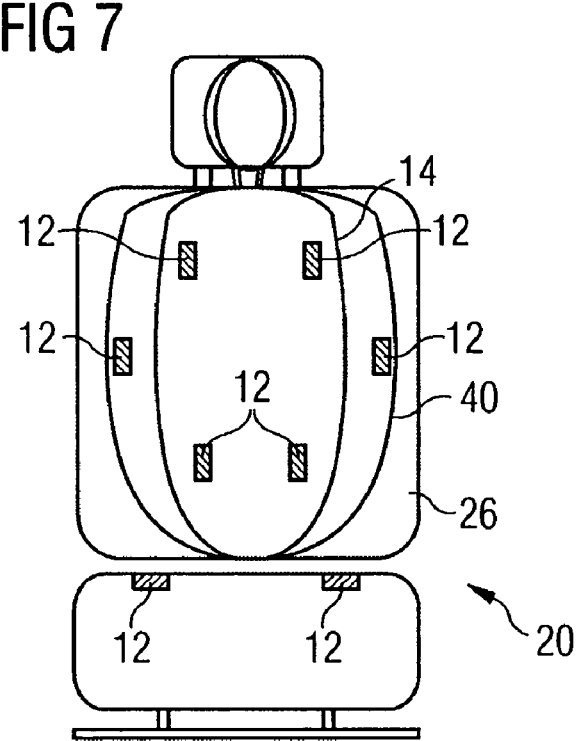
FIG. 7—A vehicle seat for use in a system to which the invention relates with the outlines of the upper body of two people of different build.

FIG. 7 shows a vehicle seat for use in a system to which the invention relates with the outlines of the upper body of two people of different sizes. This figure shows a person 40 of large build and a person 14 of a smaller build. Given a suitable arrangement of the reflectors 12 in the back support 26 of the vehicle seat 20 all the reflectors 12 may be covered by the person 40 of large build, whereas the thinner person 14 leaves the outer reflectors 12 exposed.

Figure 8:
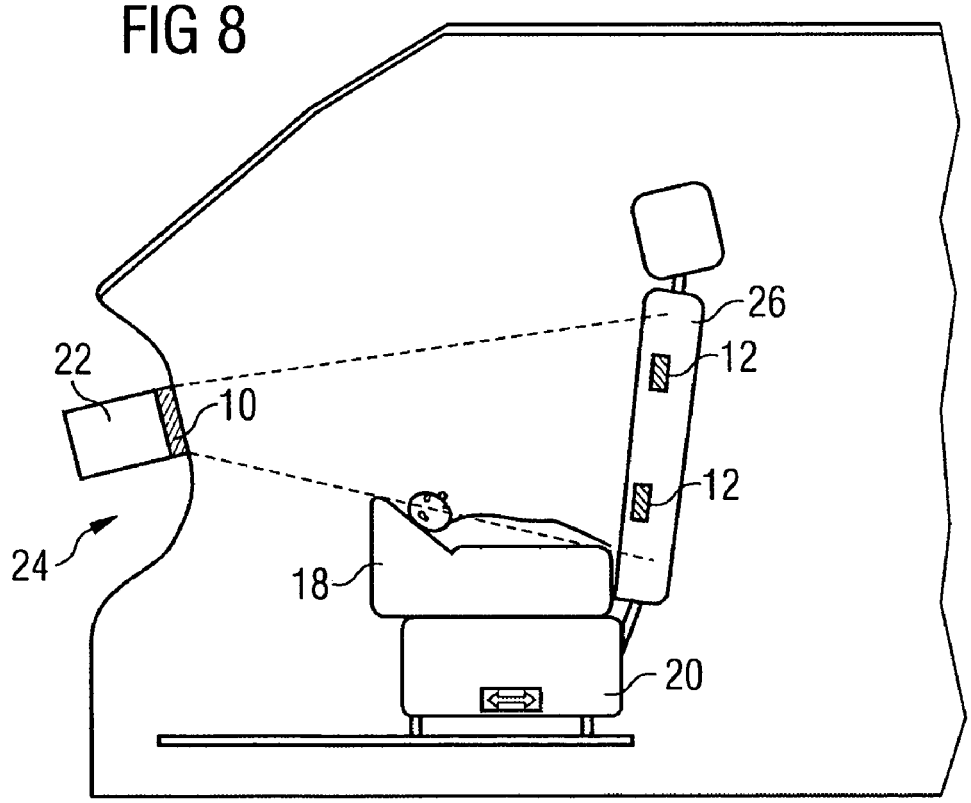
FIG. 8—The embodiment according to FIG. 4 with a seat occupied by a baby seat.

FIG. 8 shows the embodiment according to FIG. 4 with a seat occupied by a baby seat. In this case a baby is in a child seat, lying in a seat 18 of a type known as a Reboard. This is normally attached to the passenger seat 20. Due to the relative positions of the microwave transmitting and receiving device 10, the reflectors 12 and the Reboard seat 18, only slight attenuation of the microwave radiation occurs. Deployment of the airbag is consequently prevented. Additionally it is possible and in certain circumstances very useful to attach reflectors to the back of the Reboard seat 18. It is then possible to distinguish the situation with a child seat 18 on the seat 22 from the situation where there is no object on the seat 20, for example with the aid of special modulation of the microwave radiation by reflectors, or on the basis of propagation time measurement, or by assigning different time slots to the individual reflectors. For example in the system to which the invention relates, if the reflectors 12 are obscured by a metal object, this causes a strong reflection. The intensity of this reflection may be in the same order of magnitude as the intensity of the reflection from the reflectors 12. There are then different options regarding how the control unit 22 can detect the different situations.

If the reflectors are back-scatter devices with unequivocal coding, whether via the modulation frequency or via time slots, then the reflection from the obscuring metal object is unequivocally recognised on this basis. Alternatively or in addition, the reflection from an obscuring metal object can be recognised on the basis of propagation time measurement, particularly if the propagation time is compared with the actual seat position, which can be determined with the aid of an additional sensor.

Likewise it is advantageous that objects with or without low electrical conductivity in front of the reflectors 12 should shield the reflectors 12 only slightly. The signals received by the control unit then match the "empty seat" situation, and deployment of the airbag is correctly disabled.

Figure 9:
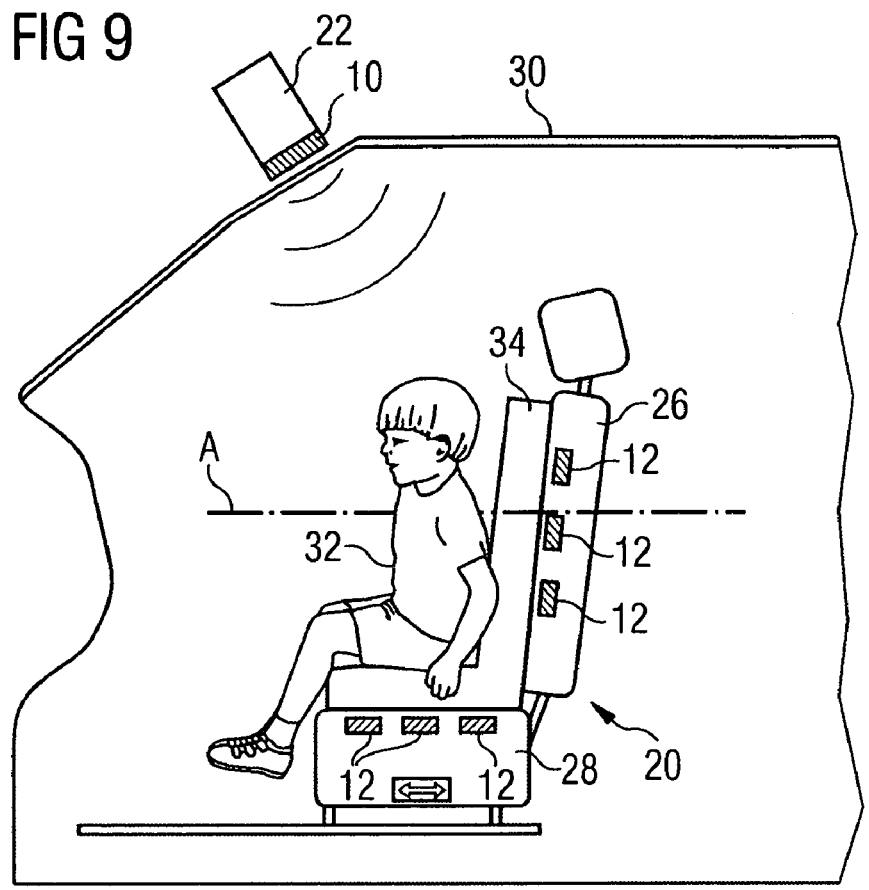
FIG. 9—The embodiment according to FIG. 1 with a seat occupied by a child seat.

FIG. 9 shows the embodiment according to FIG. 1 with a seat occupied by a child seat. On the basis of the system to which the invention relates the situation shown here can also be distinguished from an adult leaning forward. A child 32 is sitting on a child seat 34 which is arranged on the seat 20. A plurality of reflectors are arranged not only in the seat surface 28 of the seat 20 but also in the back support 26 of the seat 20. Due to the child seat 34, which in general absorbs microwaves very much less than the body of the child 32, microwaves can find their way between the microwave transmitting and receiving device 10 and the reflectors 12 in the back support 26 or in the seat surface 28, particularly when there are diffraction fringes. The reflectors 12 in the seat surface 28 therefore receive a higher intensity than they would receive if an adult were sitting directly on the seat surface 28.

Thus with a suitable arrangement of a plurality of reflectors 12 and an equally suitable arrangement of the microwave transmitting and receiving device 10, different situations with regard to the seat occupancy in the vehicle can be detected.

Figure 10:
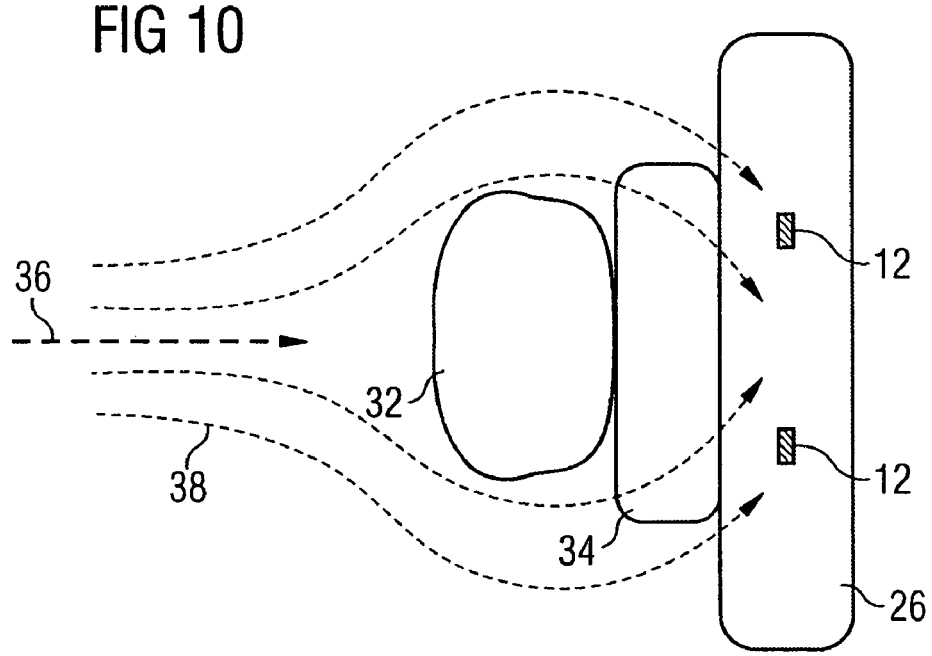
FIG. 10—A sectional view from above of the arrangement shown in FIG. 9.

FIG. 10 shows a sectional view of the arrangement in FIG. 9, seen from above. The section in FIG. 10 is taken at the level labelled A in FIG. 9. It shows different paths by which microwave radiation can reach the reflectors 12 in the back support 26, from which the situation of a child 32 on a child seat 34 will be assumed. On the one hand there is the direct path 32 between the microwave transmitting and receiving device 10 and the reflectors 12 which in this situation are shielded by the child 32. However, due to the separation between the child 32 and the reflectors 12, which is held constant by the child seat 34, microwaves can also travel from the microwave transmitting and receiving device 10 to the reflectors 12 and back again along indirect paths 38, for example as a result of diffraction around the body and reflection or scattering. This is hampered only to an insignificant extent by the child seat 34, which has a very low absorption capacity compared to the human body.

The principle of the present invention has been explained on the basis of this description of the drawings with the aid of a system in which reflectors, in particular back-scatter devices, are arranged in the vehicle seat. In this case a microwave transmitter and a microwave receiver are necessary. The microwave transmitter sends microwave radiation towards the reflectors. The reflectors reflect the microwave radiation back towards the microwave transmitter. For preference the microwave transmitter and microwave receiver are produced in the form of a microwave transmitting and receiving device. However, the invention also relates to systems in which receivers with a small surface area are arranged in the seat instead of small-area reflectors. In this case it is sufficient to have a microwave transmitter which sends the microwave radiation towards the receivers arranged in the seat. The advantageous intensity curves produced when a person occupying the seat leans forward can then also be obtained in particular by summing the intensities of the individual receivers arranged in the seat.

The invention can be summarised as follows. A system for detecting the seat occupancy in a vehicle includes a microwave transmitter 10 and a plurality of small-area reflectors 12 which are arranged in the vehicle. By activating or deactivating the different reflectors 12 during different time intervals, the reflectors 12 can be identified via the unequivocal assignment between the time intervals and the reflectors. This makes it possible to use narrow-band microwave radiation, since it is then not absolutely necessary to identify the reflectors 12 with the aid of different frequencies. It is also possible to arrange receivers in the seat 20 instead of reflectors 12.

The features of the invention disclosed in this description, in the drawings and in the claims can be significant, both individually and in any combination, for the accomplishment of the invention.

We claim:

1. A system for detecting the seat occupancy in a vehicle, comprising
    at least one microwave transmitter,
    reflectors which are arranged in the vehicle, and
    at least one microwave receiver,
wherein
    the at least one microwave transmitter and the reflectors are arranged so that the reflected intensity depends on the seat occupancy in the vehicle,
    the reflectors can be selectively activated or deactivated during defined time intervals,
    the reflectors can be distinguished from one another via an assignment of the reflectors to the time intervals, and
    the reflectors are modulating back-scatter devices.

2. The system according to claim 1, wherein the reflectors are arranged in at least one vehicle seat and/or one head restraint.

3. The system according to claim 1, wherein the back-scatter devices can be modulated at the same frequency.

4. The system according to claim 1, wherein the back-scatter devices can be modulated at the different frequencies.

5. The system according to claim 1, wherein reflectors are arranged one below the other in a rest or support in the vehicle seat.

6. The system according to claim 1, wherein the back-scatter device is produced as an active back-scatter device.

7. The system according to claim 1, wherein
    the seat occupancy affects the received intensity by virtue of the diffraction of the microwaves and
    the received intensity provides information on the seat occupancy.

8. The system according to claim 1, wherein the one or more microwave transmitters and the one or more microwave receivers are produced as one or more microwave transmitting and receiving devices with transmitting and receiving antennae.

9. The system according to claim 1, wherein a control unit which triggers, disables or enables functions in the vehicle depending on the radiation received is provided.

10. The system according to claim 1, wherein evaluation of the signals received by the microwave receiver is supported or carried out in ways which are used in the context of an access control and start-up system installed in the vehicle.

11. The system according to claim 1, wherein the radiation path is a straight line.

12. The system according to claim 1, wherein radiation from the microwave transmitter is guided with the aid of conducting materials built into the vehicle.

13. A method for detecting a seat occupancy in a vehicle, comprising the steps of:
    arranging one or more microwave transmitters and one or more reflectors for transmitting and reflecting microwave radiation in such a way that a received intensity depends on the seat occupancy in the vehicle,
    transmitting microwave radiation,
    reflecting the microwave radiation through the reflectors which are arranged in the vehicle
    selectively activating or deactivating the reflectors during defined time intervals and
    distinguishing the reflectors from one another via an assignment of the reflectors to the time intervals, wherein the reflection takes place by means of a back-scatter process.

14. The method according to claim 13, wherein the reflectors are arranged in at least one vehicle seat and/or one head restraint.

15. The method according to claim 13, wherein the back-scatter processes which take place on the different reflectors use the same modulation frequency.

16. The method according to claim 13, wherein the back-scatter processes which take place on the different reflectors use different modulation frequencies.

17. The method according to claim 13, wherein reflectors are arranged one below the other in a rest or support in the vehicle seat.

18. The method according to claim 13, wherein the back-scatter process is produced by an active back-scatter device.

19. The method according to claim 13, wherein
    the seat occupancy affects the received intensity by virtue of the diffraction of the microwaves, and
    the received intensity provides information on the seat occupancy.

20. The method according to claim 13, wherein functions in the vehicle are triggered, disabled or enabled depending on the radiation received.

21. The method according to claim 13, wherein evaluation of the signals received is supported or carried out in ways which are used in the context of an access control and start-up system installed in the vehicle.

22. The method according to claim 13, wherein the radiation path is a straight line.

23. The method according to claim 13, wherein radiation from the microwave transmitter is guided with the aid of conducting materials built into the vehicle.

* * * * *